Dec. 22, 1931.  J. E. SWAIM ET AL  1,838,012
EMASCULATOME
Filed Sept. 18, 1930
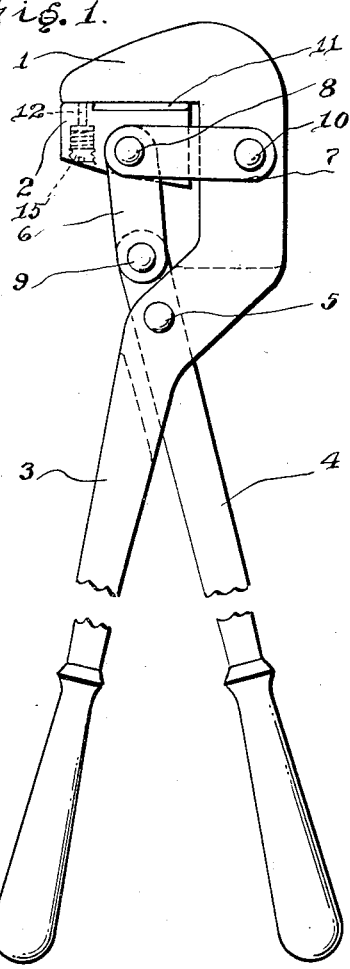
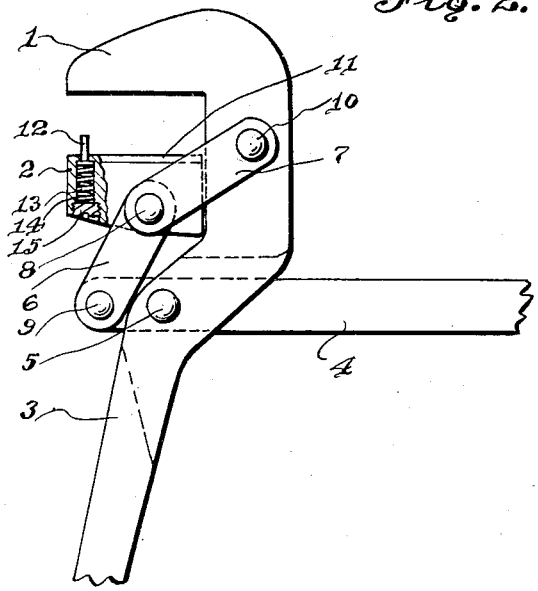
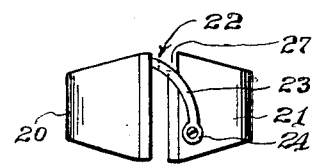
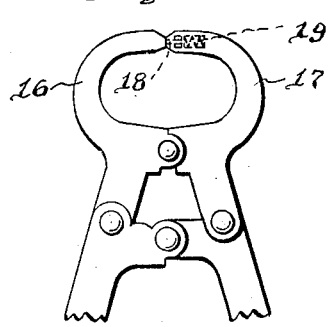
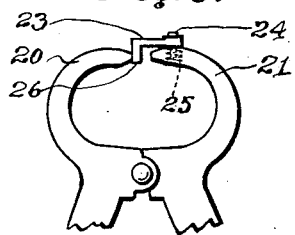
INVENTORS.
John E. Swaim
Frank Lane
BY
J. Kaplan.
ATTORNEY.

Patented Dec. 22, 1931

1,838,012

UNITED STATES PATENT OFFICE

JOHN EARL SWAIM, OF CHICAGO, ILLINOIS, AND FRANK LANE, OF MOUNT PLEASANT, IOWA

EMASCULATOME

Application filed September 18, 1930. Serial No. 482,835.

This invention relates to veterinary implements and more particularly to emasculatomes for castrating animals.

The principal object of the invention is to provide an instrument for bloodlessly crushing or severing the spermatic cord of animals without causing an open wound in the scrotum.

Another object of the invention is the provision of means to hold the spermatic cord in place while the operation is being performed.

Still another object of the invention is to provide a system of links or levers for exerting a large amount of pressure on the movable jaws with but little pressure on the handles.

With these and other objects in view, as will more fully appear as the description proceeds, the invention consists in certain constructions and arrangements of the parts that we shall fully hereafter describe and claim, reference being had to the accompanying drawings, in which:

Figure 1 is a view of the emasculatome shown in a closed position.

Figure 2 is a similar view as Figure 1 but showing the device in an opened position.

Figure 3 is a fragmentary view of a modified form of the invention.

Figure 4 is a top view of another modification of the invention and

Figure 5 is a fragmentary side view thereof.

Referring now to the drawings in detail, numbers 1 and 2 designate the jaws of the instrument, 3 and 4 the handle members, and 5 the bolt for pivotally connecting the handle members together. The jaw 2 is movable and is connected to the handle 4 by the link 6 and to the jaw 1 by the link 7. Both of these links have a common pivoting bolt 8. Numeral 9 designates the pivoting bolt for connecting together the link 6 and handle 4, and 10 the bolt for pivotally fastening the link 7 to jaw 1. The drawings show one set of links 6 and 7 but, however, there is another set of similar link members in the opposite side of the instrument.

The jaw 2 consists of a movable block having a tapered cutting edge 11 at the top. At the outward end of this jaw is an attachment for holding the spermatic duct or cord of the animal and prevent same from slipping out between the jaws of the device during the operation. This attachment consists of plunger 12 pressed from behind by a spring 13 and housed in the recess 14 of the jaw. A plug 15 is provided which screws into the bottom of the recess and holds the spring and plunger in position. When the jaws meet as shown in Figure 1 the plunger will be retracted and when the jaws are separated the plunger will protrude.

The working of this device is as follows. The jaws 1 and 2 are first separated by moving the handle 4 away from the handle 3. This action will cause a pull on the link 6 and move the jaw 2 down. The jaws 1 and 2 are then placed around the part to be operated and the handle members are closed together. The jaw 2 will then move forward for performing the operation. However, before the operation is actually performed the plunger 12 will first come in contact with the spermatic cord and hold same in place against the jaw 1 and prevent same from slipping.

In Figure 3 is shown a fragmentary view of a different type of instrument with the plunger mechanism, the same as shown in Figures 1 and 2, applied thereto for holding the spermatic cord during the operation. Numerals 16 and 17 designate the jaws, 18 the plunger and 19 the spring for normally pushing the plunger forward.

In Figures 4 and 5 is shown a similar instrument as indicated in Figure 3 but with a different means of holding the spermatic cord. Numerals 20 and 21 designate the jaws and 22 the holding means for the spermatic cord. Said means consists of a curved arm 23 pivoted to the jaw 21 by the bolt 24. Around the bolt in a recess in the jaw is a torsion spring 25 for normally urging the ends of the arm against the inside edge of the jaw 20. The end of the arm is provided with a downwardly bent member 26 as shown in Figure 5 which holds the spermatic cord against the edge of the jaw. A portion of the jaw 23 is cut out as at 27 for clearance so as not to interfere with the downwardly bent member 26 when the jaws are closed up.

It will thus be seen that we have provided a simple and efficient device for the purpose specified. With the system of links in the preferred form of the invention shown in Figures 1 and 2 a great amount of pressure can be exerted between the jaws with a small amount of effort on the handle members. The function of the link 7 is to movably hold the jaw 2 in place while the link 6 exerts the up-and-down pull on the jaw 2. With the use of the plunger mechanism one person can complete the operation without having another person hold the spermatic cord from slipping from between the jaws of the device.

Having described our invention, we claim:

1. In an emasculator comprising jaw and handle members, said handle members pivotally connected together, one of said jaw members being movable and the other of said jaw members being stationary, a set of links connected at one end to a common pivoting bolt fastened to the said movable jaw member, the opposite ends of said links connected to the fixed jaw member and handle member, said link members arranged to actuate the said movable jaw when one of the handle members is moved.

2. In a device of the class described in combination, a pair of handle members pivotally connected together, one of the said handle members having an extending longitudinal portion at the top forming a stationary jaw, a movable jaw, a link pivoted to the end of the other handle member, the opposite end of said link pivoted to the said movable jaw, another link attached at one end to the said movable jaw and at the opposite end to the said stationary jaw, said links arranged to operate the movable jaw parallel to the said stationary jaw when one of the handle members is moved.

3. In a device of the class described, the combination of a movable and stationary jaw member, of a pair of links connecting the movable jaw member to the stationary jaw member, a handle member extending from the stationary jaw, another handle member pivotally connected to the first mentioned handle member, and another pair of links connecting the movable jaw member to the second mentioned handle member, all of said links having a common pivoting point where connected to said movable jaw member.

4. In a device of the class described in combination, a pair of handle members pivotally connected together, one of the said handle members having an extending longitudinal portion at the top forming a stationary jaw, a movable jaw, a link pivoted to the end of the other handle member, the opposite end of said link pivoted to the said movable jaw, another link attached at one end to the said movable jaw and at the opposite end to the said stationary jaw, said links arranged to operate the movable jaw parallel to the said stationary jaw when one of the handle members is moved, and a spring pressed plunger attached to one of the jaws.

5. In a device of the class described, the combination of a movable and stationary jaw member, of a pair of links connecting the movable jaw member to the stationary jaw member, a handle member extending from the stationary jaw, another handle member pivotally connected to the first mentioned handle member, and another pair of links connecting the movable jaw member to the second mentioned handle member, all of said links having a common pivoting point where connected to said movable jaw member, and a spring pressed plunger attached to one of the jaws.

6. In a device of the class described, the combination of two jaw members connected together, of an arm pivoted to the top of one of said jaw members, the outside end of said arm arranged to contact with the other jaw member, and means to urge the end of said arm against the last mentioned jaw member.

In testimony whereof we affix our signatures.

FRANK LANE.
JOHN EARL SWAIM.